(12) United States Patent
Shin

(10) Patent No.: US 7,840,203 B2
(45) Date of Patent: Nov. 23, 2010

(54) PROCESS AND SYSTEM FOR AUTOMATICALLY TRANSMITTING AUDIO/VIDEO CONTENT FROM AN ELECTRONIC DEVICE TO DESIRED RECIPIENT(S)

(76) Inventor: Edward M. Shin, 77 W. Wacker Dr., Suite 2500, Chicago, IL (US) 60601

(*) Notice: Subject to any disclaimer, the term of this patent is extended or adjusted under 35 U.S.C. 154(b) by 804 days.

(21) Appl. No.: 11/731,498

(22) Filed: Mar. 30, 2007

(65) Prior Publication Data
US 2008/0178251 A1 Jul. 24, 2008

Related U.S. Application Data

(60) Provisional application No. 60/881,770, filed on Jan. 22, 2007.

(51) Int. Cl.
*H04M 11/04* (2006.01)
(52) U.S. Cl. .................................. 455/404.1; 455/3.06
(58) Field of Classification Search ............... 455/3.06, 455/456.1, 457, 404.1
See application file for complete search history.

(56) References Cited

U.S. PATENT DOCUMENTS

| 4,884,132 | A | 11/1989 | Morris et al. |
|---|---|---|---|
| 5,929,897 | A | 7/1999 | Schneider et al. |
| 6,449,260 | B1 | 9/2002 | Sassin et al. |
| 6,876,302 | B1 | 4/2005 | Steeves |
| 2004/0146047 | A1 | 7/2004 | Turcan et al. |
| 2006/0201964 | A1 | 9/2006 | DiPerna et al. |
| 2006/0276200 | A1* | 12/2006 | Radhakrishnan et al. . 455/456.1 |
| 2007/0042747 | A1* | 2/2007 | Sun ............................ 455/403 |

* cited by examiner

*Primary Examiner*—Tu X Nguyen

(57) ABSTRACT

A method and apparatus for the automatic acquisition and transmission of audio-video content by a portable wireless communications device, such as a cellular telephone, is provided. The transmission of audio-video content can be initiated locally by a user of the device, or remotely. Upon initiation, audio-video content is automatically captured, such as via a digital video camera circuit. The content is then automatically transmitted to one or more recipients. The content can be transmitted through the periodic transmission of emails, each containing an attachment with a segment of audio-video content, or via video streaming connections.

2 Claims, 7 Drawing Sheets

PROCESS AND SYSTEM FOR AUTOMATICALLY TRANSMITTING AUDIO/VIDEO CONTENT FROM AN ELECTRONIC DEVICE TO DESIRED RECIPIENT(S)

TECHNICAL FIELD

The present invention relates generally to the transmission of audio/video data by wireless communication devices such as a cellular telephone, and more particularly, to the automatic transmission of audio/video data from a wireless communication device to one or more predetermined recipients.

BACKGROUND OF THE INVENTION

Wireless communication devices, such as cellular telephones, are becoming increasingly prevalent amongst users of all types. In many societies, nearly every adult, and many children, carry cellular telephones everywhere they go. In addition to enabling more rapid and persistent communications, cellular telephones are also considered by many to provide added benefits relating to safety and personal security.

For example, in some circumstances in which an individual feels threatened or requires emergency assistance, the individual can place a telephone call to police or another individual in order to request assistance. In such circumstances, many modern cellular communication systems are further able to provide location information, such as GPS coordinates, such that the location of the individual requiring assistance can be rapidly and accurately identified. However, such a telephonic communication may provide limited information concerning the emergency situation to the call recipient. It may also be difficult to complete a call in some emergency situations.

The ongoing revolution in wireless communication technologies has recently carried over to audio and video technologies. Several cellular telephones on the market today have built-in video, photo, and audio recording capabilities. Several computers with built-in digital cameras and other electronic digital recording devices—such as digital cameras and camcorders—may also have "wi-fi" or other wireless communication capabilities (collectively with cellular telephones, the "Wireless Device"). Once an audio or video file (such as, by way of examples, .JPG files for digital photographs, .WAV files for audio files, and .MPG files for video files) ("A/V Content") is created from such a Wireless Device, these files can be wirelessly and electronically transmitted to one or more recipient locations, such as a personal computer, an Internet email account, or other Internet website. To do so, however, a user is typically required to undertake the additional step or steps of sending such files to the Recipient, such as by manually entering one or more e-mail addresses or designated recipients using the Wireless Device's keypad or other character entry mechanism, and then pressing a key or series of keys to send the transmission.

The capture of A/V Content can also be achieved by devices without integrated wireless or Internet capability. Examples of such devices include a digital camera, video camera, audio recorder, or other digital recording device. However the capture and subsequent transmission of such A/V Content to a Recipient, has traditionally involved three or more separate operations. In the first operation, the user of the electronic device creates A/V Content by capturing and/or recording A/V Content, which is then saved in a digital memory integrated within the electronic device (e.g., a solid state memory card or onboard RAM). In the second operation, the user of the electronic device is then required to upload the A/V Content to a system having communication capabilities to electronically send such files to a Recipient, such as the user's personal computer with Internet access. Finally, the user can then transmit A/V Content via the Internet to designated recipients, either via email or by uploading A/V Content to a dedicated website.

While such existing technologies permit the communication of digital A/V Content, there are some circumstances in which it may be beneficial to enable the rapid and automated transmission of A/V Content from a portable communications device to one or more designated recipients. For example, if an individual feels a threat to his or her personal security, it may be desirable to enable the user to instantly capture and transmit audio, image and/or video data portraying a potential assailant or suspicious individual, in order to deter any further threatening activity. It may further be desirable to provide security and emergency services via a readily-available device having wireless communications capabilities, such as a standard cellular telephone.

SUMMARY OF THE INVENTION

In accordance with one aspect of the invention, a portable communications device—such as a cellular telephone—is provided, which is capable of automatically transmitting audio-video content to one or more recipients in response to a user input. The portable communications device includes a wireless transceiver capable of communicating data via a wireless communications network. In some embodiments, the wireless transceiver may include a cellular radio transceiver adapted for communications with a digital cellular radio communications network. An audio-video content acquisition circuit is also provided. The audio-video content acquisition circuit is capable of acquiring digital audio and/or digital video or digital image data. In some embodiments, the audio-video acquisition circuit can be implemented by a "camera phone" feature of a cellular telephone. The portable communications device also includes one or more microprocessors. The one or more microprocessors are adapted to respond to a user input, such as the pressing of a button or receipt of a voice recognition instruction, to initiate the automatic acquisition of audio-video content by the audio-video content acquisition circuit.

The audio-video content is automatically transmitted to one or more recipients via the wireless transceiver. One way in which the audio-video content can be transmitted is through generation, and transmission of one or more email messages by the microprocessors, via the wireless transceiver. A segment of audio-video content can be attached to each email message. For example, in some embodiments, the microprocessors could be configured to generate and transmit an email message every five seconds, with each message containing a five-second segment of audio-video content as an attachment. In such an embodiment, the one or more recipients can include one or more email addresses, to which each email is sent. The recipients can be manually predetermined by the user, or determined dynamically based on information such as the location of the portable communication device.

Another way in which the audio-video content can be transmitted to one or more recipients is through video streaming. The portable communications device in such an embodiment can include a video streaming application implemented by the one or more microprocessors. The microprocessors can act to implement video streaming connections with the one or more recipients, and then transmit the acquired audio-video content via the video streaming connections.

In accordance with another aspect of the invention, a method is provided. One such method is a method of using a cellular telephone having an integrated digital camera and adapted for wireless communications using a cellular communications network. The method includes the step of receiving a predetermined user input, such as the depression of a button or receipt of a voice command, by the cellular telephone to initiate an audio-video content recording and transmission operation. In response to the user input, the cellular telephone automatically records multiple segments of audio-video content using, at least in part, the integrated digital camera feature. The method further includes the step of transmitting each segment of audio-video content via the cellular communications network after it is recorded. The transmission takes place automatically, without further user input, and is directed to one or more predetermined recipients.

The step of transmitting the audio-video content may be implemented by generating one or more email messages addressed to the predetermined recipients. A segment of audio-video content is attached to each email message. The messages are then periodically transmitted. Additional information can be inserted into one or more of the email messages, to provide further information to the recipient(s). Such additional or supplemental information may include information indicative of the location of the cellular telephone. The additional information may also include personal data, such as the user's name or medical information. In some embodiments, the predetermined recipients may be identified beforehand, such as through the manual entry of email addresses by a user of the cellular telephone. In other embodiments, the recipients can be identified based, at least in part, on various criteria, such as the location of the cellular telephone.

The audio-video content can also be transmitted by the cellular telephone through a streaming video connection. In such embodiments, the cellular telephone can initiate a streaming video connection with the one or more recipients, and then transmit audio-video content via the streaming video connection(s) as the content is captured.

These and other aspects of the invention will be apparent to one of skill in the pertinent art, in view of the description and drawings provided herein.

DETAILED DESCRIPTION

Figure 1:
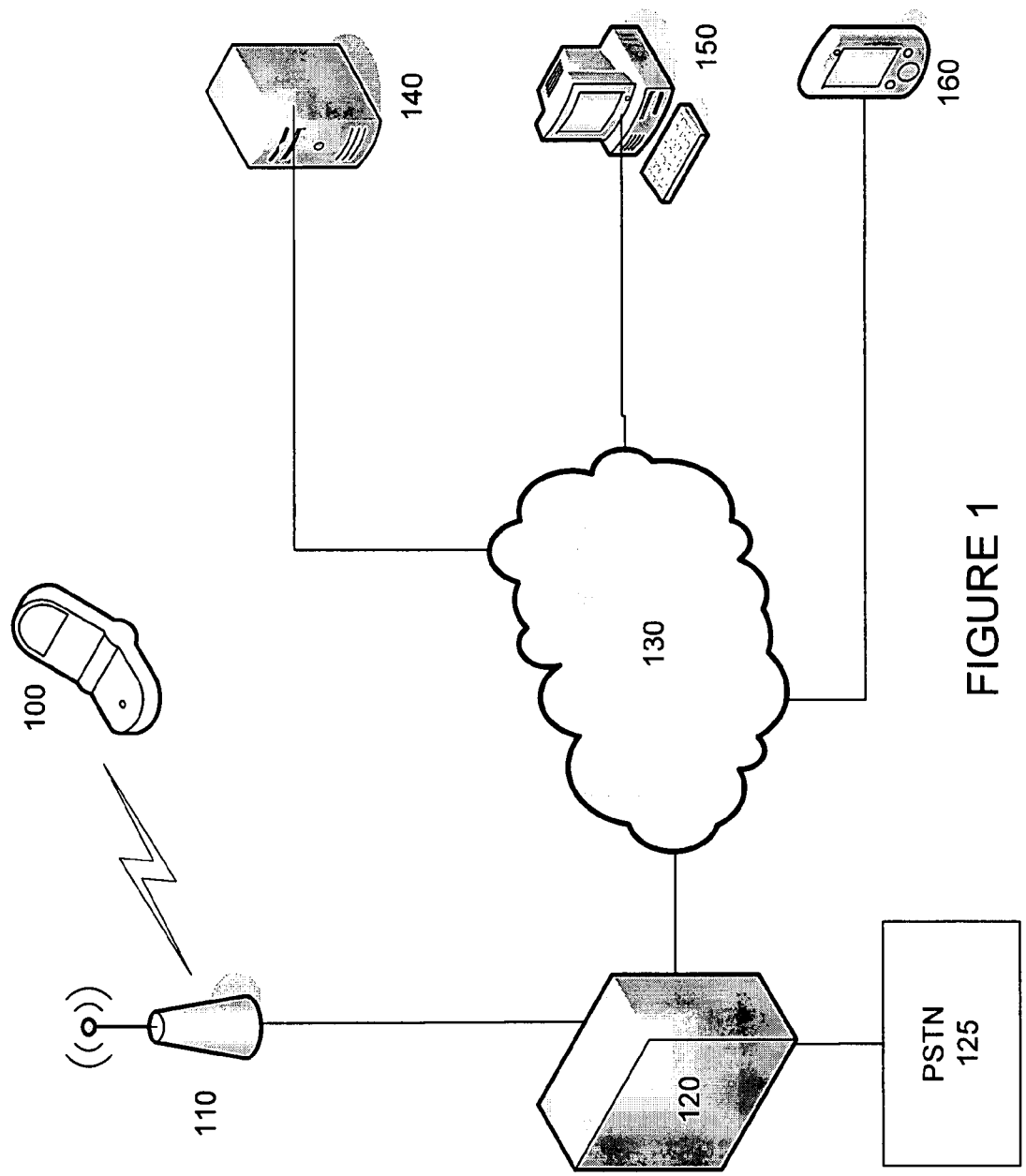
FIG. 1 is a schematic block diagram of a communications system with which an embodiment of the invention can be employed.

While this invention is susceptible of embodiment in many different forms, there are shown in the drawings and will herein be described in detail, certain specific embodiments with the understanding that the present disclosure should be considered as an exemplification of the principles of the invention and is not intended to limit the invention to the embodiments so illustrated.

FIG. 1 is a block diagram of a communications system with which embodiments of the present invention can be implemented. In the embodiment of FIG. 1, wireless device 100 is a cellular telephone having integrated digital camera and digital video recording capabilities. Cellular telephone 100 communicates with cellular base station 110, and communications network infrastructure 120, towards enabling the communication of voice and data with other devices, such as devices connected to public switched telephone network 125. Cellular infrastructure 120 further includes an Internet gateway enabling the exchange of data communications between the cellular communications network and Internet 130. Amongst the devices connected to Internet 130 are server 140, personal computer 150 and Personal Digital Assistant ("PDA") 160.

Figure 2:
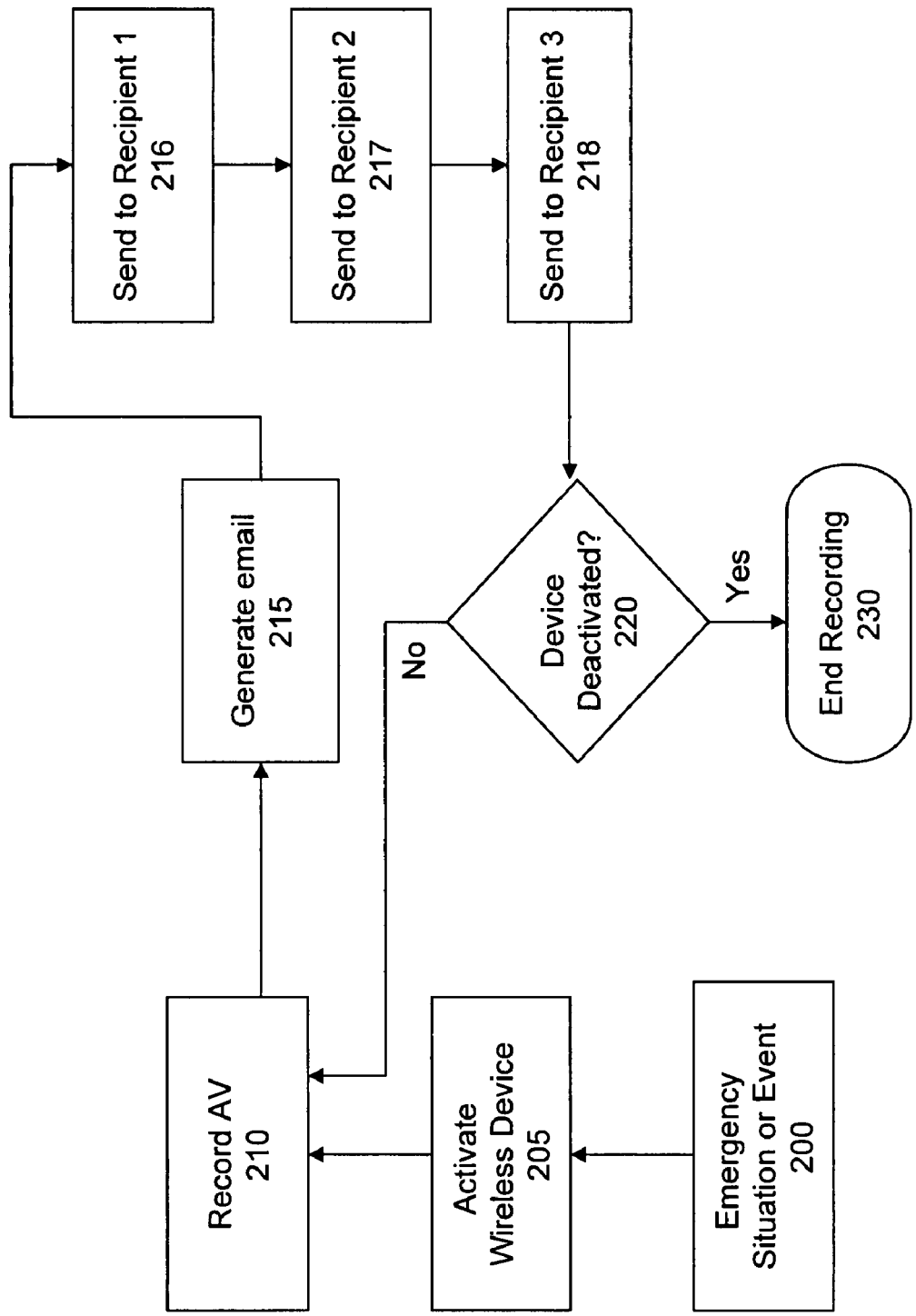
FIG. 2 is a flowchart illustrating a process for automatically disseminating audio-video content via one or more email messages.

FIG. 2 is a block diagram of a process according to one aspect of the invention, in which a user can communicate audio-visual information with one or more predetermined communication recipients in an emergency situation. In step 200, an emergency situation (such as an automobile accident, robbery, attack, life-threatening medical condition) or potential threat (such as a potential attacker or criminal perpetrator) is witnessed, experienced, or encountered by an individual holding wireless device 100. In step 205, the user activates and directs wireless device 100 towards the emergency situation, potential attacker, or on him/herself.

Activation step 205 initiates the operation of a data recording operation by wireless device 100 (step 210). For example, activation step 205 may be implemented by depressing a button or key on wireless device 100 that is programmed to operate as an emergency button. In step 210, a digital video and audio recording operation is initiated by wireless device 100, using an integrated video camera function. Thus, A/V Content is captured in step 210 which provides information concerning the emergency situation experienced in step 200. While step 210 contemplates the capture of digital video, it is understood that some cellular telephone or other wireless communications products may use previously-provided digital camera functionality rather than digital video recording, in which case still digital images can be captured in connection with step 210.

In step 215, the A/V Content generated and created in step 210 is attached to an e-mail by wireless device 100. The email is automatically transmitted to pre-designated Recipients 140, 150 and 160 in steps 216, 217 and 218, respectively, via cellular base station 110, communications network 120 and Internet 130. In the illustrated embodiment, recipient 160 is an electronic device, such as a cellular phone or a PDA device having wireless email capabilities via a wireless Ethernet interface or other wireless data network, which may be carried by a friend, family member or colleague of the user of wireless device 100. Similarly, personal computer 150 may belong to a friend, family member or colleague of the user of wireless device 100. Finally, server 140 can be operated by an emergency response service provider, such as the police or a private security service.

Optionally, wireless device 100 can also be configured to automatically insert additional information into the e-mail generated in step 215. For example, wireless device 100 may insert information such as the user's GPS location, as well as predetermined personal information such as the user's vital statistics, social security number, personal contact information, emergency contact information, medical history or related health information, and self-portrait. Such additional information can be used by communication recipients to improve their ability to appropriately respond to the situation experienced in step 200.

In step 220, wireless device 100 determines whether the A/V recording mode has been explicitly deactivated. If so, the device ceases its recording and transmission operation (step 230). If not, the device returns to step 210, whereby it continually records A/V data and automatically transmits that data to predetermined recipients, until the process is deactivated. Wireless device 100 can be configured to record and send A/V data in predetermined intervals, such as five-second intervals, to ensure that the A/V Content is promptly and regularly transmitted. It may be desirable to implement a mechanism by which unintentional deactivation of the process is avoided, or by which individuals other than the authorized user are prevented from deactivating the process. In some such embodiments, deactivation requires entry of a four-digit code on keypad 603. In other embodiments, deactivation requires a predetermined voice command, which is detected by microphone 604 and recognized by voice recognition software implemented by CPU 613.

Figure 3:
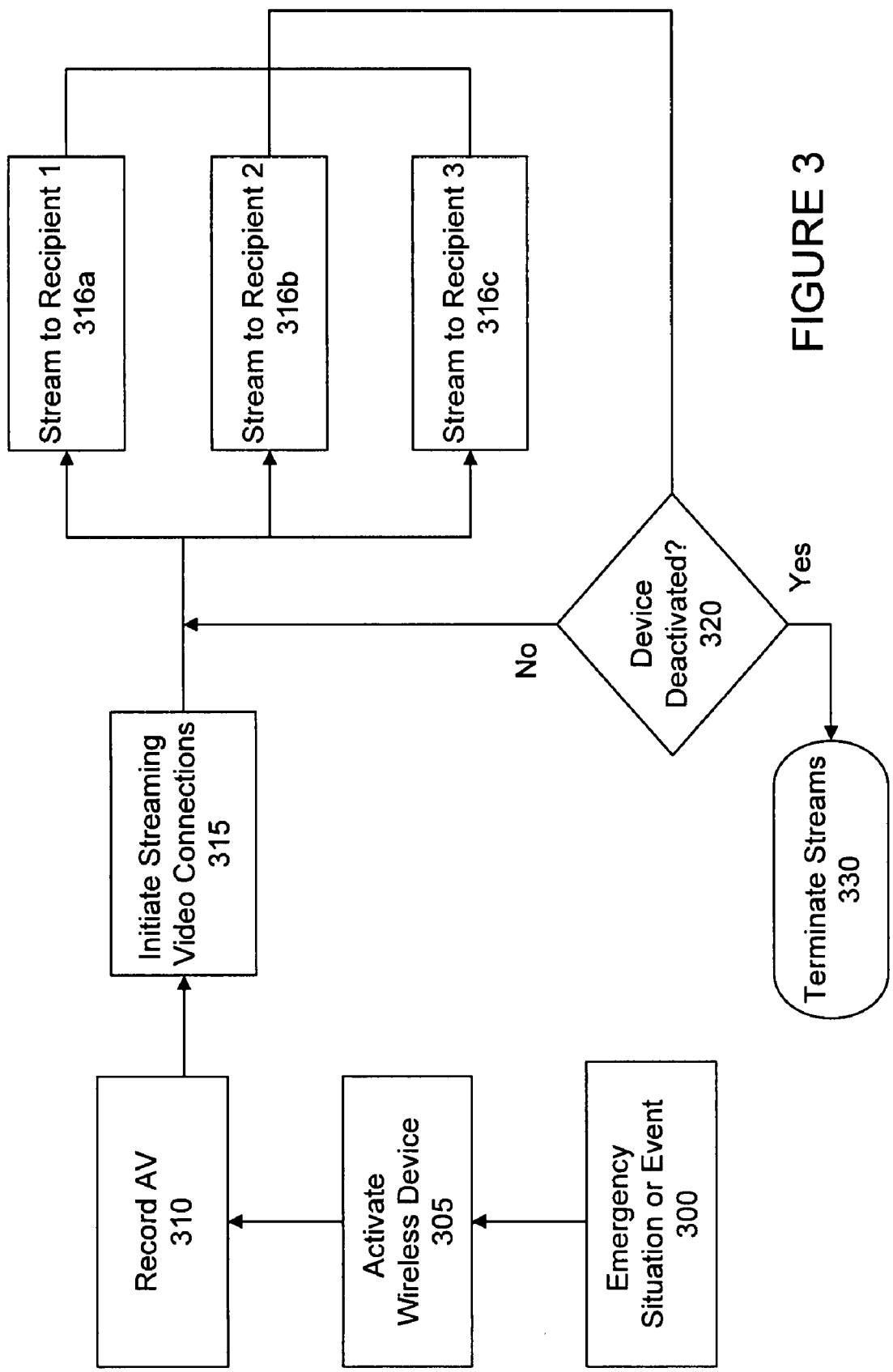
FIG. 3 is a flowchart illustrating a process for automatically disseminating audio-video content via one or more streaming video connections.

In addition to periodic transmission of email messages having A/V Content attached thereto, it is also contemplated that other techniques for the transmission of A/V Content can be employed. For example, FIG. 3 illustrates an embodiment in which a streaming video connection is employed to transfer A/V Content. In steps 300, 305 and 310, an emergency situation is observed, a wireless device is activated, and the recording of A/V Content is automatically initiated, analogously to steps 200, 205 and 210 in FIG. 2. However, in the embodiment of FIG. 3, wireless device 100 is provided with a video streaming application. In step 315, the video streaming application of wireless device 100 initiates a streaming video connection with one or more predetermined recipients, implementing corresponding streaming video client application. In steps 316a, 316b and 316c, the A/V Content recorded by wireless device 100 is simultaneously streamed. Periodically, wireless device 100 determines whether the video streaming operation has been deactivated (step 320). If so, the streaming connections are terminated. If not, the video streaming continues to forward A/V Content to the pre-designated recipients in near-real time.

While embodiments of the invention described herein include two specific methods of transmitting A/V content (i.e., via attachment to e-mail messages and via a streaming audio/video connection), the scope of the invention is not limited to those embodiments. Rather, it is contemplated that other methods of transmitting an A/V file via a wireless communications network which are known or may subsequently become known to those skilled in the art could also be employed in association with the present invention. Specifically, the invention also encompasses the transmission of an A/V file on its own as a standalone file (with or without embedded information identifying the user, the user's location, or other information), and/or in association with other proprietary formats for transmitting A/V content which may be developed or implemented by a user of the invention.

In some embodiments of the invention, it may be desirable to implement measures towards verification of the authenticity and accuracy of the A/V content that is recorded and transmitted. For example, in applications where the invention is used to capture evidence of a crime or other incident having legal consequences, it may be desirable to implement measures which may act to enhance the evidentiary value of the recorded content. One such embodiment operates in connection with the process of FIG. 2, in which the A/V content is transmitted via one or more emails. In such an embodiment, the emails are transmitted in steps 216-218 via a secured or registered email service, such as the system commercially available and known as the RPost Registered Email service. Furthermore, in step 210 of the embodiment of FIG. 2, or in step 310 of the embodiment of FIG. 3, the A/V content can be encrypted prior to transmission, using known and commonly available data encryption techniques, towards further reducing the opportunity for tampering or alteration of the A/V content.

The pre-designated Recipients for any of the above-referenced embodiments may include any number of entities or individuals capable of receiving and reviewing the A/V Content e-mails or video streams. Such Recipients may include—but are not limited to—wireless PDA or cellular phone 160 operated by the user's spouse or relative, personal computer 150 accessing the user's own e-mail address, and/or server 140 operated by a monitoring service specifically retained by the user to monitor, record and respond to such emergency communications (a "Monitoring Recipient").

Pre-designated recipients, such as the user's spouse or a Monitoring Recipient, can respond to the activation of emergency A/V Content transmission by contacting either the user to confirm his/her current condition or status, or a nearby police department, fire department, or emergency medical response center. When A/V Content is sent via e-mail, the A/V Content can be stored and later accessible by each Recipient via the Recipient's e-mail account. Accordingly, the user may also designate his/her own e-mail account as a recipient in order to maintain an account of the emergency situation for his/her own records and later use. In embodiments utilizing a video streaming architecture, recipient video streaming clients may be configured to maintain the A/V Content for later review by recording the content onto a digital storage medium as it is received.

In many circumstances, the amount of memory provided on portable wireless devices is limited, in order to reduce the size, weight and cost of the device. Accordingly, such wireless devices may have a limited period during which they can record A/V Content before filling their memory. However, by implementing the process of FIG. 2, the A/V Content is periodically transmitted to one or more remote email boxes, and stored therein. After a particular segment of A/V Content has been transmitted, it can be deleted from wireless device 100, thereby creating additional memory available for recording new content. Accordingly, in the process of FIG. 2, the amount of A/V Content that can be recorded is not limited by the amount of memory contained within the portable wireless device.

Figure 4:
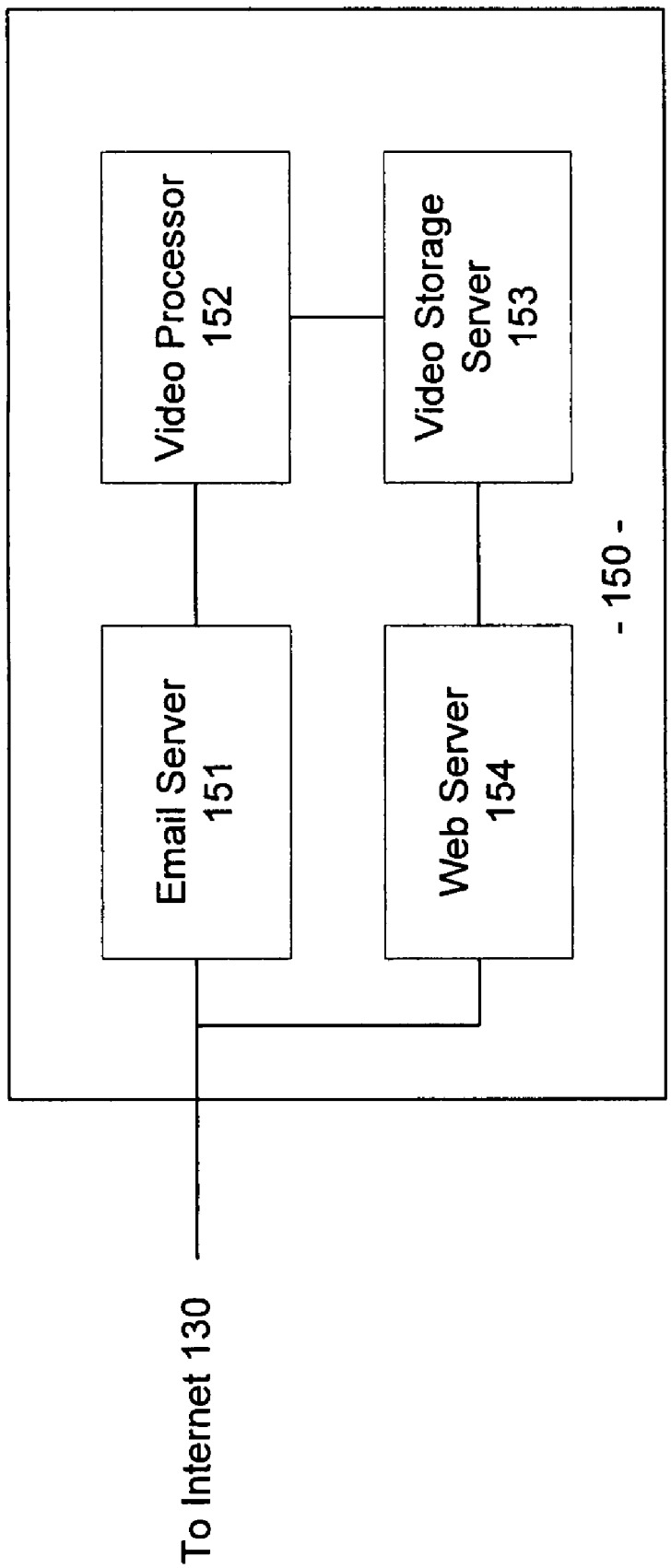
FIG. 4 is a schematic illustration of an application server for receiving and storing audio-video content from a portable wireless device.

As described above, amongst the recipients that can be pre-designated to receive A/V Content in connection with the present invention is content server 150. One possible embodiment of content server 150 is illustrated in FIG. 4. While illustrated schematically in FIG. 4 as a plurality of virtual machines operating on a single physical server, it is understood that alternative configurations could be used to implement similar functionality. Email server 151 receives email messages transmitted by wireless device 100, and stores the messages with A/V Content attachments. Video processor 152 communicates with email server 151 to read a plurality of email messages and attachments consecutively transmitted by wireless device 100, towards extracting the A/V Content from the attachments and concatenating the content into a continuous recording. The reconstituted recording can then be archived on video storage server 153.

Content server 150 further includes web server 154. Web server 154 provides an Internet web portal for viewing of reconstituted A/V Content from any location having Internet access and a standard web browser. Many modern cellular telephones or other portable wireless devices have integrated web browser functionality, which can be used to access previously-recorded A/V Content via a web portal implemented by web server 154. Furthermore, by accessing the A/V Content as a video stream from web server 154, a portable wireless device can receive a lengthy portion of A/V Content without having to store a potentially large amount of data locally on the portable wireless device.

In utilizing this invention, therefore, the User is not limited by the storage capacity of the Wireless Device's memory chip or similar storage media. Additionally, the User can almost immediately access and/or share A/V Content with other individuals or entities with Internet access to web server 154 or a recipient e-mail account.

Figure 5:
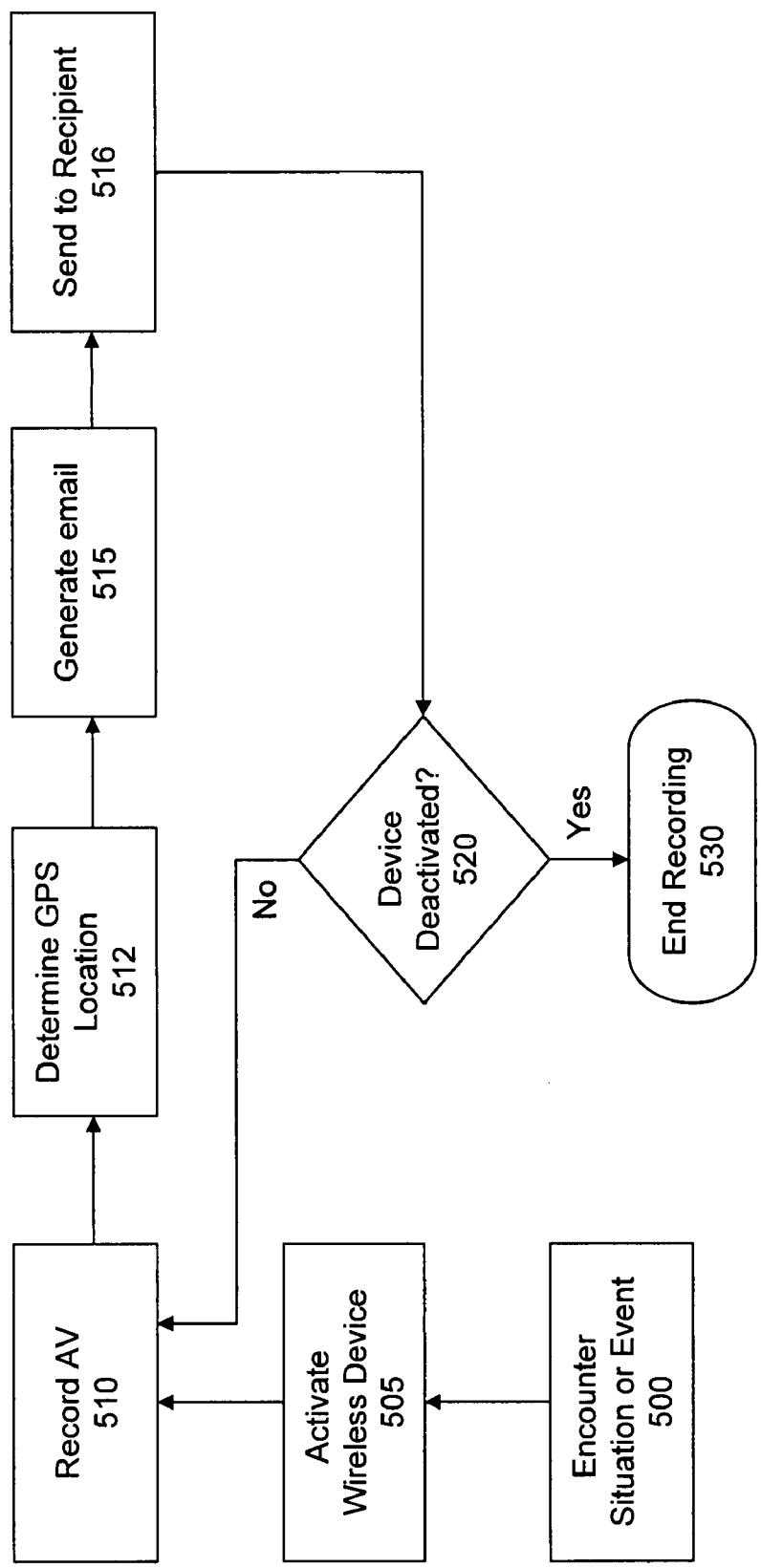
FIG. 5 is a flowchart illustrating a process for automatically disseminating audio-video content and other information via one or more email messages.

Embodiments of the invention can also be used for purposes of reporting to pre-designated recipients when conducting surveillance or other similar activities involving regular reporting to a central control or monitoring center. FIG. 5 illustrates once example of such an application.

In the embodiment of FIG. 5, a user carrying wireless device 100 either encounters during his patrol or other surveillance activity an abnormal situation, or desires to submit a report of observations made during his patrol (step 500). The user activates and directs wireless device 100 toward the abnormal situation or object or scene being reported, and activates the recording of A/V Content (step 505). A segment of A/V Content is recorded by wireless device 100 in step 510. The location of wireless device 100 is then determined using a GPS receiver integrated into wireless device 100 (step 512). In step 515, an email is generated containing the GPS coordinates determined in step 512, the A/V Content recorded in step 510 as an attachment, and predetermined content describing the identity and contact information corresponding to the user of wireless device 100. In step 516, the e-mail is sent to recipients. Such recipients may include—but are not limited to—any number of entities or individuals capable of receiving and reviewing these e-mails, such as the user's supervising officer or manager, the user's personal e-mail address, or a home-base or central monitoring facility. In step 520, the recording and transmission process continues automatically generating emails until terminated.

If the User's supervising officer/manager or central monitoring facility requires additional information, an attempt can be made to contact the user, such as via contact information automatically inserted into the email communications by wireless device 100 in step 515. The user's supervising officer/manager or central monitoring facility may also choose to contact others to investigate or respond to the recorded situation or event. Because A/V Content is sent via e-mail, the A/V Content can be stored and is later accessible by each recipient via the recipient's e-mail account.

While in some embodiments the e-mail recipients are pre-designated, it is also understood that other embodiments may include recipients who are dynamically determined to optimize the selection of recipients. For example, in the embodiment of FIG. 2, in the step 215 of generating an email communication, wireless device 100 may analyze its location using an integrated GPS receiver, towards identifying the police station, monitoring service and/or friend or relative that is located closest to the user of wireless device 100. The selected recipients are then targeted in email transmission steps 216-218.

Figure 6:
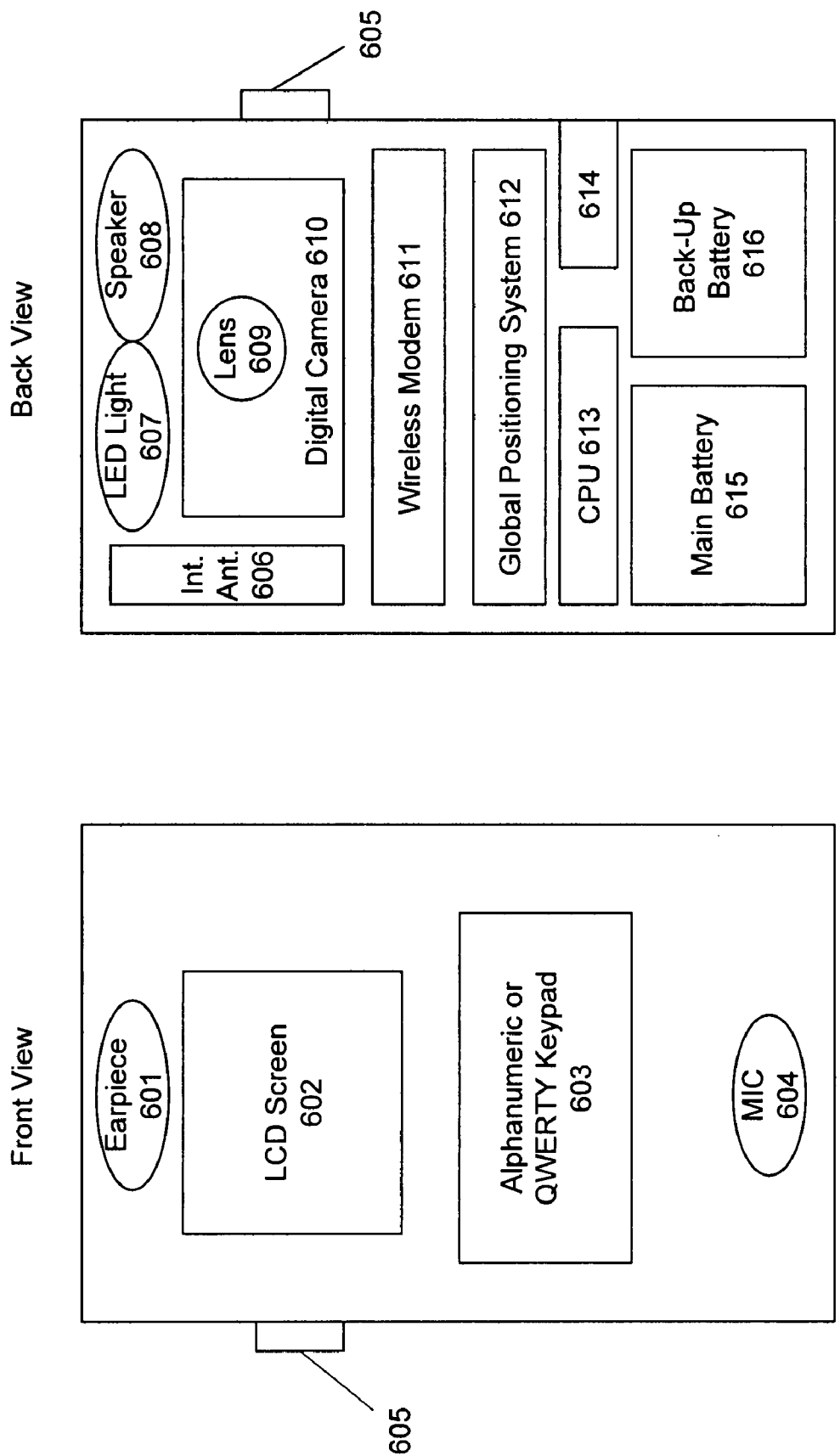
FIG. 6 is a schematic block diagram of a wireless communications device.

FIG. 6 is an exemplary functional block diagram of components which may be included in wireless device 100. The external appearance of the device of this example may be typical of other cellular telephones or similar communications devices currently in the market. Indeed, with appropriate programming, it is contemplated that functionality described herein could be implemented using hardware features provided in standard cellular smart phones. Due to its conventional shape and appearance, in an emergency situation, wireless device 100 will not be misconstrued as a weapon by a potential perpetrator or by responding police officers. The fact that the principles of the present invention may be utilized in conjunction with and in addition to a conventional cellular telephone improves the utility and capabilities of the device.

The components in the cellular telephone of FIG. 6 include: (1) an earpiece 601; (2) a liquid crystal display or other color screen 602; (3) an alphanumeric or QWERTY keypad 603; (4) an audio microphone 604; (5) an emergency activation button 605; (6) an internal or external antenna 606; (7) an LED, digital camera flash or other light source capable of illuminating objects or individuals in lowlight conditions 607; (8) a speaker 608; (9) a camera lens 609; (10) digital camera 610; (11) a wireless modem 611; (12) a global positioning system or chip 612; (13) a CPU microprocessor or other computer control apparatus 613; (14) a memory card or other storage media slot 614; (15) main batteries/charger for the cellular telephone's primary functions, such as placing telephone calls 615; and (16) a dedicated back-up battery for the operation of the present invention 616. Additional or fewer components could comprise the cellular telephone described herein without departing from the scope or spirit of the present invention.

With further reference to FIG. 6, digital camera 610 may utilize a charge-coupled-device (CCD) and electronic imaging and storage circuitry currently known in the art. Lens 609 is operatively coupled to and integrated with digital camera 610 to enable the taking of digital pictures/images and video of a desired subject or scene. In typical embodiments, the lens 609 will be auto-focusing, although other types of lenses may be used. The output from the digital camera 610 is viewable on the LCD screen 602 and attached to an e-mail or other similar communications method, as described herein. The e-mail, in turn, is transmitted via wireless modem 611, and antenna 606 to which the modem is coupled. The wireless modem 611 can be configured to implement one or more wireless communication protocols, such as a EVDO or EDGE cellular network protocols, Bluetooth™, Wi-Fi, and the like. The global positioning system receiver ("GPS") 612 is commonly provided in general purpose cellular telephones and operates to identify the current location of wireless device 100 through orbiting satellites.

An LED light or similar light source 607 is powered by one or more of batteries 615 and 616. This light source will provide illumination of the scene, individual(s), or events to aid the ability of digital camera 610 to capture and record A/V Content. Microphone 604—typically used in cellular telephone conversations—allows audio signals and events to be recorded along with digital images and video captured by the digital camera 610. LED light 607 and audio microphone 604 are commercially available.

While lens 601 and LED light or similar light source 607 are shown in close proximity to each other, they may also be mounted on different areas or parts of wireless device 100 for purposes of increasing visual clarity or reducing artifacts. Similarly, audio speaker 608 and microphone 604 may also be mounted on different areas or parts of wireless device 100 to improve audio clarity or reducing background or other undesired noise.

Operation of the various components and modules identified herein is controlled by CPU microprocessor or computer control system 613. In addition to main rechargeable battery 615, a rechargeable back-up battery 616 may also be used to power all of the wireless device's components and modules, which is applied when the emergency activation button 605 is activated by the User. In some embodiments, emergency activation button 605 may be a pre-existing, programmable functionality button provided on a standard cellular phone or smart phone. In other embodiments, the device and/or process may be initiated by voice recognition capabilities of the cellular phone. In still other embodiments, to prevent accidental activation of emergency activation button 605, a protective cover may be utilized that must be moved before the button may be depressed. Alternatively, other techniques for confirming the user's intent may be employed, such as requiring the depression of both emergency activation button 605 and one or more buttons on keypad 603 simultaneously or in predetermined sequence, or requiring voice activation by preset code word once the emergency activation button is depressed. By providing a button cover, requiring voice confirmation, or providing some other means of verifying a user's intent to activate the automatic recording and transmission of A/V data, the likelihood of accidental or unintended transmission of A/V content is reduced. Such intent confirmation procedures can be particularly valuable in embodiments that automatically transmit A/V content to police, a private security service, or another entity which incurs some cost and/or effort in responding to the transmissions.

Figure 7:
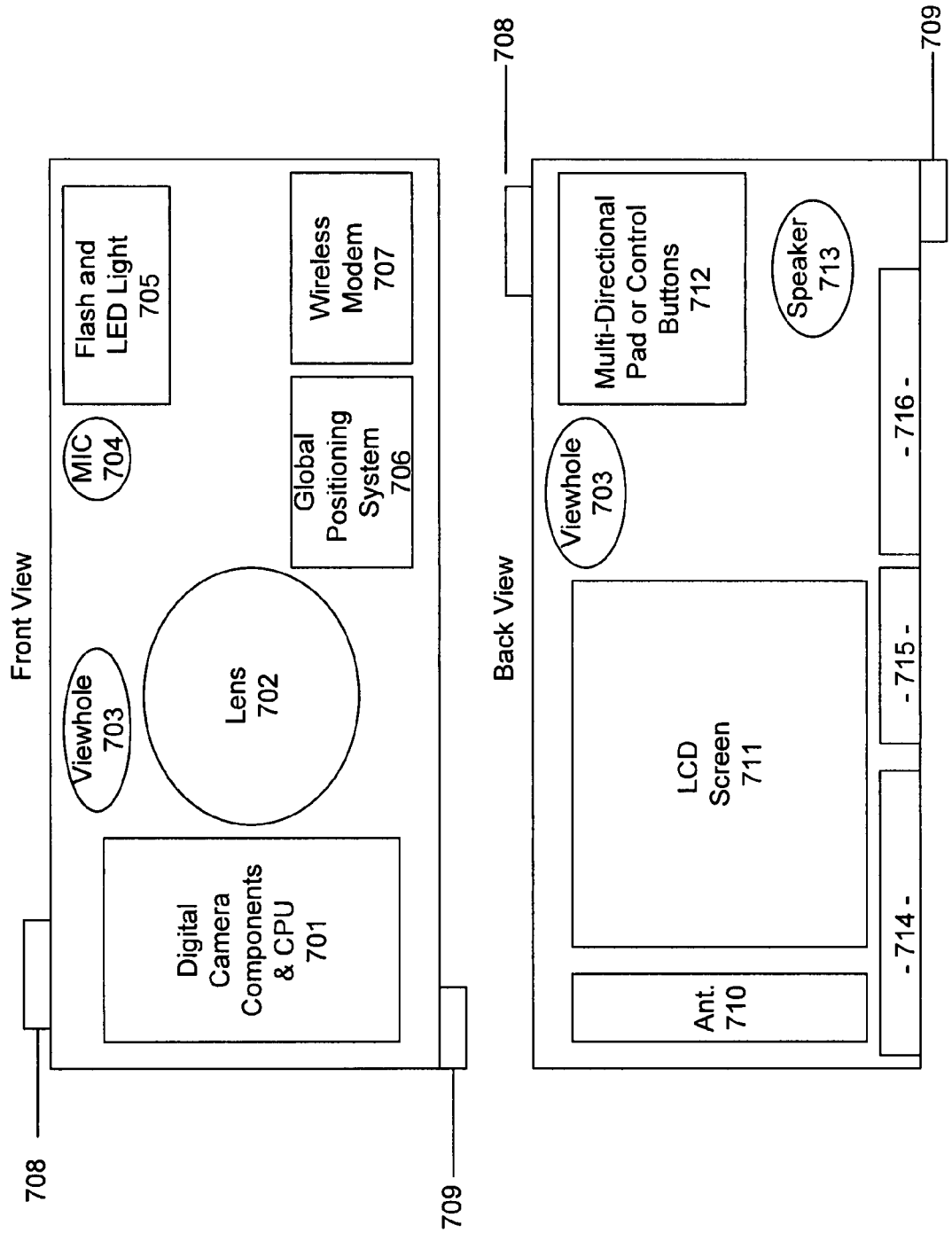
FIG. 7 is a schematic block diagram of an alternative wireless communications device.

Alternative embodiments of the invention can be implemented in association with a digital camera or camcorder. FIG. 7 is an exemplary functional block diagram of components which may be included in an embodiment of the invention based on a digital camera, camcorder or other similar digital image recording device. The external appearance of the device of this example may be typical of other digital cameras or camcorders or similar digital recording device currently in the market. Alternatively, portable computers having integrated digital camera functionality can be employed. Due to its conventional shape and appearance, in an emergency situation, the device will not be misconstrued as a weapon by a potential perpetrator or by responding police officers. The fact that the principles of the present invention may be utilized in conjunction with and in addition to a conventional digital camera, camcorder, or other digital recording device provides increased utility.

The components in the digital camera or camcorder of FIG. 7 include the following: (1) a digital camera, its components, and CPU microprocessor 701; (2) a camera lens 702; (3) a viewing aperture 703; (4) an audio microphone 704; (5) a flash and/or LED light capable of allowing A/V Content capture in lowlight conditions 705; (6) a GPS receiver 706; (7) a wireless modem 707; (8) a conventional activation button, generally used to take a digital picture or video 708; (9) an emergency activation button 709; (10) antenna 710; (11) liquid crystal display 711; (12) multi-directional keypad or control buttons 712; (13) speaker 713; (14) main battery/charger 714; (15) digital storage media receptacle 715; and (16) back-up battery/charger 716.

Digital camera or camcorder 701 utilizes a charge-coupled-device (CCD) and supporting electronic and storage circuitry currently known in the art. Lens 702 is operatively coupled to and integrated with digital camera 701 to enable the taking of digital pictures/images and video of a desired subject or scene. In most embodiments, the lens 702 will be auto-focusing, although other types of lenses may be used. The output from the digital camera 701 is viewable on the LCD screen 711 and attached to an e-mail or other similar communications method, as described herein. The e-mail, in turn, is applied to wireless modem 707 which operates upon the e-mail to prepare it for wireless transmission via the antenna 710 to which the modem is coupled.

A flash, LED light or similar light source 705 is powered by main battery 714 or back-up battery 716 once the system described in the present invention is activated. This light source will provide sufficient illumination of the scene, individual(s), or events to effectively aid the digital camera in capturing and recording A/V Content. Microphone 704—typically used in digital camcorders to record audio signals—allows audio signals and events to be recorded along with digital images and video captured by the digital camera 701. LED light 705 and audio microphones 704 are commercially available.

Operation of the various components and modules identified herein is controlled by the Wireless Device's CPU microprocessor or computer control system 701. In addition to main rechargeable battery 714, a rechargeable back-up battery 716 may also be used to power all of the wireless device's components and modules, which is applied when emergency activation button 709 is activated by the user. To prevent accidental activation of emergency activation button 709, a protective cover may be utilized that must be moved before the button may be depressed. Alternatively, activation of the process described herein may require depressing both the emergency activation button and another button on the Wireless Device simultaneously, such as the conventional action button 708.

With the digital camera or camcorder illustrated in FIG. 7, the processes of FIGS. 2, 3 and/or 5 can be readily implemented to provide automatic communication of A/V Content to one or more recipients.

With the above-described embodiments, the creation of A/V Content and the transmission of such content to a one or more recipients can be executed in a single action. This process and/or apparatus can be beneficially employed in a number of different contexts. One such context is crime and emergency notification and reporting. Several crimes may be prevented by simply having the appropriate deterrent. Prior art includes home alarm systems and security cameras, which have a deterrent effect due to their ability to quickly notify individuals who can respond to a potential crime, and also record the crime as it takes place. Unfortunately, typical home alarms and security cameras are not portable, and cannot provide an individual out in public with the means to deter crimes against the person. Individuals who carry cellular phones can also contact law enforcement agencies using traditional cellular telephone service, generally by dialing 911. Unfortunately, individuals who call 911 during the commission of a crime are often incapable of accurately describing the criminal perpetrator, or may not have sufficient time to apprise law enforcement of his/her location before the criminal perpetrator has stripped that individual of his/her cellular phone. By allowing individuals to automatically record and transmit A/V Content to pre-designated Recipients, the present invention provides many of the safety characteristics of both home alarms and security cameras, while also solving problems inherent with calling 911 during the commission of a crime.

Similarly, individuals who either witness a crime or experience a medical or other emergency and call 911 may be incapable of accurately describing the events as they are occurring, or accurately describing their location. Such witnesses will be better able to aid law enforcement or emergency medical efforts by instantly transmitting A/V Content showing the events as they happen and their location.

Another application in which embodiments of the present invention can be beneficially employed is A/V content storage and back-up. Currently, prior art with respect to the storage of A/V Content from digital cameras or camcorders includes memory cards, digital video discs ("DVD"), mini digital video tapes ("Mini DV"), and other storage media. The instant system, method, and device can reduce or even eliminate a digital camera's or camcorder's dependence on such media for purposes of content storage. Utilizing the instant invention, a device—such as a digital camera or camcorder equipped with wireless Internet connectivity—can transmit A/V Content the moment it is created to pre-designated Recipients, such as the User's e-mail address, or a website designated to receive, store, and display A/V Content received via e-mail or similar method of transmission. Because A/V Content is created and transmitted to a Recipient, there is no need for a digital camera or video camera equipped with wireless Internet access to possess a large amount of memory for the purpose of saving such files because the transmitted A/V Content can be readily accessed and/or viewed by the Recipient to which such files are transmitted through the Wireless Device's wireless Internet connectivity.

Embodiments of the present invention can also be employed to provide reporting capabilities. Individuals involved in routine inspections or patrols are often unable to effectively communicate with their home base during the course of their inspection or patrol. For example, a security guard performing a routine patrol of the premises he is securing generally utilizes a walkie-talkie, conventional cellular phone, or other audio communication device to report events or observations to a home base or central monitoring station. With the instant system, method, and device, the User may be able to automatically send audio and video reports of events or situations to his or her home base or central headquarters which can be viewed and efficiently stored for organizational purposes.

In accordance with another aspect of the invention, the automatic audio-video content capture and transmission functionality can be activated remotely. For example, in connection with the embodiment of FIG. 1, the user of PC 150 can transmit a message, such as an email or SMS message containing encrypted command data, to wireless device 100 via Internet 130, cellular network Internet gateway 120 and cellular network 110. Wireless device 100 responds by interpreting the message as an activation (step 205) of the automatic audio-video recording and transmission process of FIG. 2, whereby the automatic recording and dissemination of audio-video data by wireless device 100 can be implemented. This remote initiation feature can be beneficially employed in certain applications. For example, implemented on a cellular telephone, the remote initiation feature can permit a parent to monitor the whereabouts and activities of a young child carrying the cellular telephone.

The foregoing description and drawings merely explain and illustrate the invention and the invention is not limited thereto, inasmuch as those skilled in the art, having the present disclosure before them will be able to make modifications and variations therein without departing from the scope of the invention.

The invention claimed is:

1. A portable communications device comprising:
  a wireless transceiver capable of communicating data via a wireless communications network;
  an audio-video content acquisition circuit; and
  one or more microprocessors within the portable communications device executing software adapted to respond to a first user input by acquiring audio-video content from the audio-video content acquisition circuit and automatically transmitting the audio-video content to one or more predetermined recipients via the wireless transceiver; and
  the one or more microprocessors are further configured to identify the predetermined recipients based on criteria including at least the location of the portable communications device.

2. A method of using a cellular telephone having an integrated digital camera and adapted for wireless communications using a cellular communications network, comprising the steps of:
  receiving a predetermined user input by the cellular telephone to initiate an audio-video content recording and transmission operation;
  recording one or more segments of audio-video data by the cellular telephone using the integrated digital camera; and
  transmitting each segment of audio-video content, after it is recorded, via the cellular communications network, to one or more recipients, automatically and without requiring further user action; and
  identifying the recipients based on criteria including at least the location of the cellular telephone.

* * * * *